H. C. THOMPSON.
Clock Bell.
No. 70,484. Patented Nov. 5, 1867.
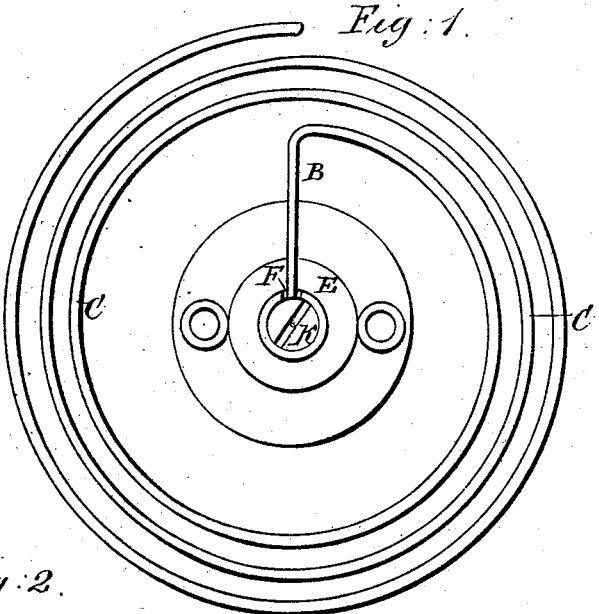
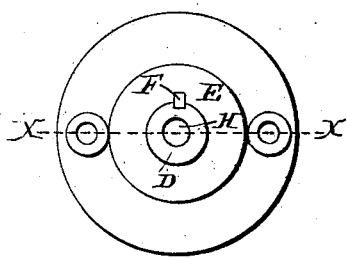
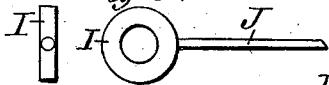
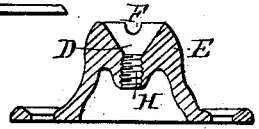
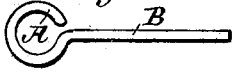
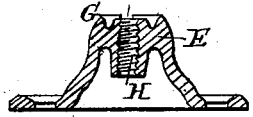
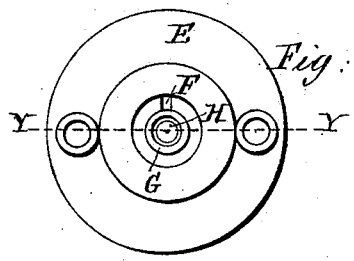
Witnesses
Henry Beckwith
James Shepard
Inventor
Hiram C. Thompson

United States Patent Office.

HIRAM C. THOMPSON, OF BRISTOL, CONNECTICUT.

Letters Patent No. 70,484, dated November 5, 1867.

---

IMPROVEMENT IN WIRE BELLS FOR CLOCKS.

---

The Schedule referred to in these Letters Patent and making part of the same.

---

TO ALL WHOM IT MAY CONCERN:

Be it known that I, HIRAM C. THOMPSON, of Bristol, in the county of Hartford, and State of Connecticut, have invented a new and improved Wire Bell for Clocks; and I do hereby declare that the following is a full, clear, and exact description thereof, which will enable others skilled in the art to make and use the same, reference being had to the accompanying drawings, forming part of this specification, in which—

Figure 1 is a top view of my invention.

Figure 2 is a top view of a cast-metal stand for receiving the wire bell.

Figure 3 is a section of fig. 2 cut through the line X.

Figure 4 is a view of the end of the wire bell.

Figure 5 are two views of the collet used on the end of an ordinary wire bell.

Figure 6 is a top view of another style of a cast-metal stand for receiving a wire bell.

Figure 7 is a section of fig. 6 cut through the line Y.

Similar letters of reference indicate like parts.

My invention consists in forming a coil or ring on the end of the shank of a wire bell, which coil or ring is recived in a conical aperture, made or cast in a suitable stand, which stand is also provided with a slot or groove, to admit the shank, when the coil or ring is secured or fastened by a bevel-headed screw running through the centre of the coil or ring.

A designates the coil or ring; B designates the shank; C designates the wire bell; D designates the conical aperture; E designates the stand; F designates the slot or groove; K designates the bevel-headed screw; G designates a swept aperture for receiving the coil or ring A; H designates a threaded hole; I designates a brass collet; J designates the shank of an ordinary wire bell; X and Y designate lines showing where the sections are cut.

The conical aperture D and the slot or groove F can be cast in the stand E. A hole, H, should be drilled through the stand E at the centre of the conical aperture D. The drill for drilling the hole H should be provided with a countersink, at a proper distance from the end, which countersink will sweep or smooth out the conical aperture D at the same time that the hole H is drilled. The hole H should then be threaded to correspond with the thread of the screw to be used. The coil or ring A, when formed, is placed in the conical aperture D with the shank B running out through the slot or groove F. The bevel-headed screw K is then passed through the coil or ring A into the threaded hole H, and tightened, which holds the wire bell C firmly on the stand E, when the bell is ready to fasten in its position for use. The top of the stand E might be swept out to fit the coil or ring A, as shown at G, figs. 6 and 7, and the coil or ring A held in its place by a square-headed screw; or, if desired, the top of the stand E can be left flat or square, the conical aperture D and the slot or groove F dispensed with, and the coil or ring A held in its place by a square-headed screw. The ordinary clock-bell is constructed by first making what clock-makers term a collet, I, of rolled brass, about one-eighth of an inch thick, and five-eighths of an inch in diameter, with a hole in the centre large enough to admit a screw. On one edge of the collet I is drilled a small hole, as shown in fig. 5, to admit the shank J of the bell-wire, when the bell is laid on its side, and the hole in the edge of the collet I swaged or partly closed with a small punch to hold the shank J in the collet I preparatory to soldering, when it is soldered with silver solder. In soldering, the collet I becomes tarnished, and is afterward brightened by smoothing both sides with a sweep. The bell is then screwed on to a stand, which is flat on the top, with a threaded hole in the centre, by putting a screw through the centre of the collet I, and then into the threaded hole in the stand. The first objection to this mode is, that it is very expensive, and next, many of the bells are not firmly soldered, and after a little use the shank J becomes loose in the collet I.

It is necessary to use borax or acid in soldering, which acid is not often thoroughly removed, and consequently causes the shank J to rust, which deadens the tone of the bell; and often the shank J rusts so badly that it breaks. Of those that do not break or become loose some are more firmly soldered than others, and consequently vary in tone.

By my invention I produce an article for clock-bells in which all the above objections are entirely obviated. The whole of the brass stock is dispensed with. As compared with the ordinary bell, a great amount of labor is saved, and consequently it can be made at a much less cost. Every bell is held firm on the stand, and is not liable to become loose by using, but should it happen to become so, it can be easily tightened. No borax or acid being used, the bell is not liable to rust. If the bells are evenly blued there will be but little variation in tone. It is much superior to the ordinary bell in every respect.

What I claim as new, and desire to secure by Letters Patent, is—

1. The coil or ring A, when formed on a wire bell, substantially as and for the purpose described.
2. I claim the bell-stand, figs. 2 and 3, substantially as and for the purpose described.

HIRAM C. THOMPSON.

Witnesses:
 HENRY BECKWITH,
 JAMES SHEPARD.